United States Patent Office 2,753,337
Patented July 3, 1956

2,753,337

PROCESS FOR PREPARING SULFURIC ACID ESTERS OF CELLULOSE

Eugene D. Klug, Wilmington, Del., assignor to Hercules Powder Company, Wilmington, Del., a corporation of Delaware No Drawing. Application September 23, 1953, Serial No. 382,003

4 Claims. (Cl. 260—215)

This invention relates to the preparation of cellulose sulfate and more particularly to the preparation of water-soluble cellulose sulfate.

Many processes have been proposed for the preparation of cellulose sulfate. Heretofore, however, these proposed processes have been complicated and expensive, and the products obtained have generally lacked desirable properties, being excessively degraded and of poor solubility characteristics. The undesirable properties in the products produced have been due principally to the fact that degradation of the cellulose molecule by the sulfating mixture proceeds simultaneously with the desired esterification reaction which introduces sulfate groups into the cellulose molecule. The sulfation reaction has generally been too sluggish in relation to the simultaneous degradative processes, and heretofore efforts to improve this situation have not been as successful as desired.

A method has now been discovered for preparing uniformly substituted water-soluble cellulose sulfates without encountering excessive degradation of the product produced. In accordance with this invention cellulose sulfate is prepared by immersing activated cellulose containing between about 0.04 and about 0.35 part water per part cellulose by weight in a sulfation reaction bath maintained at a temperature below about 10° C. to form a slurry containing up to about 8% by weight of cellulose, and agitating the slurry while maintaining the temperature of said slurry below about 10° C. until a substantially water-soluble cellulose sulfate is formed, the sulfation reaction bath containing at least about 3.5 moles of $H_2SO_4$ per mole of cellulose, between about 0.3 and not more than 1 mole of an aliphatic alcohol per mole of $H_2SO_4$, said alcohol containing from 3 to 5 carbon atoms in the molecular and selected from the group consisting of primary and secondary alcohols, and an inert volatile organic diluent, said slurry containing less than 10% water based on the combined weight of $H_2SO_4$ and water.

Under the conditions set forth above, sulfation of the cellulose proceeds uniformly at a sufficiently rapid rate so that uniformly substituted water-solube cellulose sulfate of desirable characteristics is produced without encountering undesirable degradation of the product.

Having set forth the general nature of the invention, the following examples illustrate specific embodiments thereof, but these are not to be construed as limiting the invention. In the following examples all parts, proportions, and percentages are by weight.

*Example 1*

An activated cellulose was prepared by steeping 21 parts of air-dry wood pulp containing 20 parts of pulp on a bone-dry basis in boiling water for one hour. Excess water was removed from the pulp on a suction filter, and the water-wet filter cake was washed by displacement washing on the filter with aqueous isopropanol containing 95% isopropanol and 5% water by weight. Excess isopropanol was removed from the filter cake by suction filtration, leaving a filter cake of activated cellulose containing 20 parts cellulose on a bone-dry basis, 2.32 parts water, and 23.18 parts isopropanol. This corresponds to approximately 10.4% water in the activated cellulose based on the combined weight of water and cellulose, or approximately 0.116 part water per part cellulose.

A sulfation reaction bath was prepared by mixing 180 parts by weight of toluene with 94 parts of 95% sulfuric acid, cooling to —11° C., and to this mixture while being vigorously agitated was added 14.3 parts of isopropanol which caused the temperature to rise to 2° C. The bath was again cooled to —11° C., and 22.75 parts of the above activated cellulose (corresponding to 10 parts bone-dry cellulose) was added to the sulfation reaction bath to form a slurry. Addition of the activated cellulose to the sulfation reaction bath caused the temperature of the slurry thus formed to rise to 2° C. The slurry was stirred while maintaining the temperature at 3° to 5° C. for 114 minutes, at which time solubility tests indicated that the product was completely water-soluble.

The toluene was then drawn off by decantation and the fibrous swollen product was added to about 785 parts by weight of isopropanol cooled to about —20° C. The wash liquor was drawn off and the fibrous product was then washed three times with isopropanol at 0° C., employing about 25 parts of isopropanol per part of cellulose in each wash, and filtering off each wash liquor before applying the next wash. The product was then washed exhaustively with isopropanol at room temperature until substantialy free of $H_2SO_4$. The product was then slurried in aqueous isopropanol containing 90% isopropanol and 10% water by weight and was neutralized with sodium acetate to a pH of 7, employing a neutralizing solution prepared by mixing equal volumes of 32% aqueous sodium acetate and methanol. The product was then dried at 65° C. in a forced-draft air oven.

The cellulose sulfate produced analyzed 7.1% sulfur which corresponds to a sulfate degree of substitution of about 0.46. It dissolved substantially completely in water to form a clear smooth 2% by weight solution having a viscosity of 47.9 cps. at 25° C.

Approximately 14.75 moles of $H_2SO_4$ per mole of cellulose was employed in this example, and the ratio of isopropanol to $H_2SO_4$ was approximately 0.46 mole of isopropanol per mole of $H_2SO_4$. The total water in the slurry amounted to approximately 6.96% based on the combined weights of $H_2SO_4$ and water, and the concentration of cellulose in the slurry was approximately 3.2%.

*Example 2*

An activated cellulose was prepared substantially as set forth in Example 1 except that the water-wet filter cake was washed with 100% isopropanol instead of 95% aqueous isopropanol, and the resulting filter cake of activated cellulose contained 10 parts cellulose on a bone-dry basis, 0.408 part water, and 16.79 parts of isopropanol. This corresponds to approximately 3.92% water in the activated cellulose based on the combined weight of water and cellulose, or approximately 0.041 part water per part of cellulose by weight.

A sulfation reaction bath was prepared by mixing 180 parts by weight of toluene with 94 parts of 95% sulfuric acid, cooling to —11° C., and to this mixture while being vigorously agitated was added 9.3 parts of isopropanol which caused the temperature to rise to about 2° C. The bath was again cooled to —11° C., and 27.2 parts of the above activated cellulose (corresponding to 10 parts bone-dry cellulose) was added to the sulfation reaction bath to form a slurry which caused the temperature of the slurry to rise to about 2° C. The slurry was stirred while maintaining the temperature at 3° to 5° C.

for 105 minutes, at which time solubility tests indicated that the product was completely water-soluble.

Recovery and purification of the product were carried out substantially as set forth in Example 1.

The cellulose sulfate produced analyzed 6.9% sulfur which corresponds to a sulfate degree of substitution of about 0.45. It dissolved substantially completely in water to form a clear smooth 2% solution having a viscosity of 32.2 cps. at 25° C.

Approximately 14.75 moles of $H_2SO_4$ per mole of cellulose was employed in this example, and the ratio of isopropanol to $H_2SO_4$ was approximately 0.47 mole of isopropanol per mole of $H_2SO_4$. The total water in the slurry amounted to approximately 5.4% based on the combined weight of $H_2SO_4$ and water, and the concentration of cellulose in the slurry was approximately 3.2%.

Example 3

An activated cellulose was prepared substantially as set forth in Example 1 except that the water-wet filter cake was washed with aqueous isopropanol containing 90% isopropanol and 10% water, and the resulting filter cake of activated cellulose contained 10 parts cellulose on a bone-dry basis, 1.98 parts water, and 9.82 parts isopropanol. This corresponds to approximately 16.55% water in the activated cellulose based on the combined weight of water and cellulose, or approximately 0.2 part water per part cellulose.

A sulfation reaction bath was prepared substantially as set forth in Examples 1 and 2 except that 15.8 parts isopropanol was added to the toluene-sulfuric acid mixture. The sulfation reaction was substantially as set forth in Example 2, employing 21.8 parts of the above activated cellulose (corresponding to 10 parts cellulose on a bone-dry basis). At the end of 105 minutes, solubility tests indicated that the product was completely water-soluble.

Recovery and purification of the product were carried out as set forth in Example 1.

The cellulose sulfate produced analyzed 4.3% sulfur which corresponds to a sulfate degree of substitution of about 0.25. It dissolved substantially completely in water to form a clear smooth 2% solution having a viscosity of 172.5 cps. at 25° C.

Approximately 14.75 moles of $H_2SO_4$ per mole of cellulose was employed in this example, and the ratio of isopropanol to $H_2SO_4$ was approximately 0.46 mole isopropanol per mole $H_2SO_4$. The total water in the slurry amounted to approximately 6.96% based on the combined weights of $H_2SO_4$ and water, and the concentration of cellulose in the slurry was approximately 3.2%.

Example 4

An activated cellulose was prepared by steeping air-dry wood pulp in boiling water for one hour, after which excess water was removed from the pulp on a suction filter leaving a filter cake of activated cellulose weighing 24.5 parts for each 10 parts of cellulose on a bone-dry basis. This water-wet filter cake was broken up and mixed with 17.6 parts of aqueous isopropanol containing 99% isopropanol and 1% water and allowed to stand for one hour with occasional stirring. Excess liquor was then filtered off leaving a filter cake weighing 26.3 parts composed of 10 parts cellulose on a bone-dry basis, 3.05 parts water, and 13.25 parts isopropanol. This corresponds to approximately 23.4% water in the activated cellulose based on the combined weight of water and cellulose, or approximately 0.3 part water per part cellulose.

A sulfation reaction bath was prepared substantially as set forth in Example 1 except that 12.8 parts of isopropanol was added to the toluene-sulfuric acid mixture. The sulfation reaction, employing 26.3 parts of the above activated cellulose (corresponding to 10 parts bone-dry cellulose), was substantially as set forth in Example 1. At the end of 180 minutes, solubility tests indicated that the product was completely water-soluble.

Recovery and purification of the product were carried out as set forth in Example 1.

The cellulose sulfate produced analyzed 4.4% sulfur which corresponds to a sulfate degree of substitution of about 0.26. It dissolved substantially completely in water to form a clear smooth 2% solution having a viscosity of 178 cps. at 25° C.

Substantially the same proportionate relationships between the various components in the reaction mixture were employed for this example as in the previous examples, except that the total water in the slurry amounted to approximately 7.98% based on the combined weight of $H_2SO_4$ and water.

Example 5

An activated cellulose was prepared by spraying 7.5 parts of water on 31.5 parts of air-dry wood pulp (corresponding to 30 parts cellulose on a bone-dry basis), and heating the resulting moistened cellulose in a closed vessel under pressure for two hours at 125° C. The temperature of the closed vessel and its contents was then allowed to drop back to 25° C. slowly without releasing pressure. The resulting activated cellulose contained 23% water, or approximately 0.3 part water per part cellulose.

To 235 parts of 95% sulfuric acid cooled to −5° C. was added 66 parts of isopropanol over a period of 20 minutes, and the temperature of the mixture rose to 7° C. This mixture was then added slowly to a stirred slurry containing 32.5 parts of the above activated cellulose (corresponding to 25 parts bone-dry cellulose) in 400 parts toluene, the temperature being kept at −2° to −7° C. during the addition. The resulting slurry was stirred at 5° to 7° C. for about two hours, at which time solubility tests indicated that the product was completely water-soluble.

The cellulose sulfate produced was worked up following the procedure set forth in Example 1. It analyzed 5.7% sulfur which corresponds to a sulfate degree of substitution of about 0.35. It dissolved substantially completely in water to form a clear smooth 2% solution having a viscosity of 74.4 cps. at 25° C.

Substantially the same proportionate relationships between the various components in the reaction mixture were employed as in the previous examples, except that the total water in the slurry amounted to approximately 7.95% based on the combined weight of $H_2SO_4$ and water.

An important requirement in accordance with this invention is an activated cellulose containing between about 0.04 and about 0.35 part water per part cellulose. Although activated cellulose has been employed heretofore in the preparation of cellulose sulfate, the art teaches that after activating the cellulose, water should be substantially removed from the cellulose (either by azeotropic distillation with a water-immiscible solvent such as toluene, or by exhaustive extraction with an anhydrous water-miscible solvent such as anhydrous isopropanol or glacial acetic acid, or similar solvent).

It has now been discovered, however, that the activated cellulose must contain between about 0.04 and about 0.35 part water per part cellulose for suitable reactivity in the sulfation process. It is presently preferred to employ an activated cellulose containing between about 0.2 part and about 0.3 part water per part cellulose. An activated cellulose containing less than about 0.04 part water reacts too sluggishly in the sulfation process with the result that the cellulose sulfate produced is nonuniform and excessively degraded. Similarly, an activated cellulose containing more than about 0.35 part water likewise reacts too slowly in the sulfation process with consequent nonuniformity and excessive degradation in the resulting cellulose sulfate.

Numerous methods are known and suitable for activating cellulose in accordance with this invention. For example, cellulose can be steeped in boiling water for from one to six or more hours to accomplish activation, after which excess water is removed by centrifugation or filtration, and then adjusting the final water content to a value between about 0.04 part and about 0.35 part per part of cellulose by extraction with an anhydrous or aqueous alcohol. Cellulose can also be steeped in aqueous caustic alkali solutions at any desired temperature, after which the caustic alkali is washed out of the cellulose, and the water content in the cellulose is adjusted within the aforestated limits by extraction with anhydrous or aqueous alcohol. Cellulose can be steeped in water, followed by freezing, thawing, and then adjusting the water content as indicated above. Cellulose can also be suitably activated by adding to the cellulose the required amount of water within the aforestated limits and then heating the moistened cellulose in a closed vessel under pressure at a temperature above the boiling point of water, followed by cooling the vessel and its contents slowly without releasing the pressure. Other known methods of activating cellulose will be apparent to those skilled in the art. The important objective is to activate the cellulose with water or an aqueous treating solution and then adjust the water content of the activated cellulose to a value within the limits set forth above.

The activated cellulose can be derived from any suitable and well-known source of cellulose such as cotton, cotton linters, wood pulp, and the like, in any suitable form such as shredded, granulated, finely cut, sheeted, fluffed, and the like. It is presently preferred to employ purified wood pulp as the source of cellulose employed in this invention.

The activated cellulose is immersed in the sulfation reaction bath to form a slurry containing up to about 8% by weight of cellulose on a dry-weight basis. This corresponds to about one part of cellulose to about 11.5 parts of liquid by weight, and represents about the maximum proportion of cellulose which can be readily stirred. Ordinarily, from 3% to 6% cellulose by weight is employed since this represents the optimum conditions. Smaller amounts than 3% can be employed, but it is not economical to do so.

The temperature of the reaction mixture is maintained below about 10° C. throughout the sulfation process, and preferably between about 0° and 5° C. Above about 10° C. degradation of the cellulose ordinarily becomes excessive while at temperatures substantially below 0° C. the sulfation reaction becomes too slow. Within the range from about —5° C. to about 10° C. sulfation of the cellulose proceeds uniformly and suffiiently rapidly so that uniform water-soluble cellulose sulfate is produced without encountering undesirable degradation of the product.

The reaction slurry is agitated continuously from the time the activated cellulose is added to the reaction bath until completion of the sulfation reaction in order to promote uniform sulfation of the cellulose. Agitation presents no problems, however, and any suitable and known means of agitation can be employed, such as paddle mixers, anchor stirrers, turbo mixers, and the like.

Sulfation of the cellulose is continued until a substantially water-soluble cellulose sulfate is formed, and there is no advantage to be gained by prolonging the reaction for a longer period of time. In fact, it is undesirable to prolong the sulfation process after the product has become water-soluble because excessive degradation of the product is thus encountered. The course of the sulfation reaction is readily followed by taking small samples at intervals as the reaction proceeds and testing for water solubility. Sulfation of the cellulose is considered to have proceeded sufficiently far as soon as the product dissolves substantially completely in water to form a smooth clear solution. The time will vary between about 45 minutes and 3 hours, depending upon various factors such as composition of the sulfating bath, temperature, and the like.

In accordance with one embodiment of the invention, the product is then worked up by draining off excess liquid from the swollen fibrous product and then immersing it in from 20 to 30 parts by weight of isopropanol cooled to about —10° to —20° C. to form a slurry. After draining again, the fibrous product is then washed several times, about three, with isopropanol at about 0° C., drawing off each wash liquor before applying the next wash, and is then washed exhaustively with isopropanol at room temperature until free of sulfuric acid. The product is then reslurried in aqueous isopropanol and is neutralized in the slurry with sodium acetate to a pH of 7, after which it is dried, usually at an elevated temperature of about 50° to 75° C., either in a force-draft oven or under vacuum.

The composition of the sulfation reaction bath is important in practicing this invention. To begin with, the bath must contain at least 3.5 moles of $H_2SO_4$ per mole of cellulose in order to promote sufficient sulfation of the cellulose to form a substantially completely water-soluble product. Theoretically there is no upper limit to the amount of $H_2SO_4$ which can be employed. However, in practice there is no practical advantage to be gained in employing more than about 15 moles $H_2SO_4$ per mole cellulose, and it is preferred to use between 7.5 and 15 moles. Since the rate of sulfation improves with increasing $H_2SO_4$ contents in the bath up to about 15 moles per mole of cellulose, it is advantageous to employ approximately 15 moles $H_2SO_4$ per mole of cellulose. It should be pointed out that the aforestated proportions are based on both $H_2SO_4$ and cellulose on a water-free basis. In preparing the sulfation reaction bath, however, it is convenient, although not essential, to employ 95% sulfuric acid. It is important, however, that the sulfuric acid in the reaction slurry must be of at least 90% concentration, and preferably between about 92% and 94%, based on the combined weight of $H_2SO_4$ and water in the slurry in order to promote satisfactory sulfation of the cellulose. This means that the slurry must contain less than 10% water based on the combined weight of $H_2SO_4$ and water. The water present in the activated cellulose added to the reaction bath must be taken into account in arriving at the concentration of the $H_2SO_4$ in the bath.

The sulfation reaction bath also contains between about 0.3 mole and not more than 1 mole of a primary or secondary 3- to 5-carbon aliphatic alcohol per mole of $H_2SO_4$, both ingredients being based on a water-free state. These proportions take into account any alcohol which is present in the activated cellulose added to the reaction bath. With less than about 0.3 mole of alcohol per mole of $H_2SO_4$, the sulfation reaction bath tends to dissolve the cellulose and promote excessive degradation of the cellulose molecule. With more than 1 mole of alcohol per mole of $H_2SO_4$, sulfation of the cellulose proceeds at a very slow rate or not at all.

Any 3- to 5-carbon primary or secondary saturated aliphatic alcohol is suitable for the purposes of this invention and includes normal propanol, isopropanol, normal butanol, secondary butyl alcohol, isopropyl carbinol, normal amyl alcohol, methyl propyl carbinol, diethyl carbinol, methyl isopropyl carbinol, isopropyl ethanol, and methyl ethyl ethanol. Isopropanol is preferred for economic and practical reasons. When a three-carbon alcohol such as normal propanol or isopropanol is employed, optimum proportions in the sulfation reaction bath are obtained with approximately 15% to 25% of the alcohol and 85% to 75% by weight of 95% sulfuric acid. Similarly, with a four-carbon alcohol, optimum proportions are obtained with approximately 25% to 35% of the alcohol and 75% to 65% by weight of 95% sulfuric acid. With a five-carbon alcohol, these optimum proportions amount to 35% to 45% of the alcohol and 65% to 55% by weight of 95% sulfuric acid in the reaction mixture.

The sulfation reaction bath also contains an inert volatile organic diluent. Its principal purpose is to provide additional volume to the sulfation reaction bath, since under practical working conditions the amounts of $H_2SO_4$ and alcohol employed do not provide sufficient volume so that a readily stirrable slurry of cellulose is obtained. Hence, sufficient diluent is added to the sulfuric acid-alcohol mixture to provide at least about 11.5 parts, and preferably between about 15 and about 33 parts, of total liquid per part of cellulose by weight. The minimum quantity of 11.5 parts per part of cellulose corresponds approximately to 8% by weight of cellulose in the slurry, and the preferred quantities of 15 to 33 parts correspond approximately to 3% to 6% by weight of cellulose in the slurry. It is evident, therefore, that the amount of inert volatile organic diluent will vary depending upon the amounts of sulfuric acid and alcohol in the sulfation reaction bath and upon the desired concentration of cellulose in the slurry.

Various inert diluents can be employed, as for example, aliphatic hydrocarbons such as petroleum ether, heptane, octane, Stoddard Solvent, and the like; aromatic hydrocarbons such as benzene, toluene, xylene, and the like; or chlorinated hydrocarbons such as methylene chloride, ethylene dichloride, carbon tetrachloride, and the like. Toluene is presently preferred. By "inert" is meant that the diluent does not react with any of the components in the reaction mixture under the conditions set forth. By "volatile" is meant that the diluent evaporates readily at room temperature and normal atmospheric pressure.

In practicing this invention the sulfuric acid and the alcohol, except alcohol which may be present in the activated cellulose, are mixed together with agitation while maintaining a temperature below about 10° C. If desired, the inert diluent may be added to the sulfuric acid-alcohol mixture, or alternatively, the activated cellulose may be first mixed with the inert diluent. The activated cellulose which may contain some of the alcohol and which may have been previously mixed with the inert diluent is then added to the sulfation reaction mixture while maintaining the temperature below about 10° C. Alternatively, the sulfuric acid-alcohol mixture may be added to a slurry of the activated cellulose in the inert diluent. Sulfation of the cellulose and recovery of the product are then carried out as set forth hereinabove.

An advantage which accrues from this invention is that the cellulose, activated with water, need not be given an expensive dehydration involving the use of large amounts of anhydrous alcohol.

Cellulose sulfates produced in accordance with this invention may be employed as general thickening agents, pigment dispersing materials, detergent aids, emulsion stabilizers, printing paste additives, drilling mud additives, adhesives and binders, textile sizing and finishing agents, film-forming agents, creaming agents, pharmaceutical preparations, and the like.

What I claim and desire to protect by Letters Patent is:

1. A process for preparing cellulose sulfate which comprises immersing activated cellulose containing between about 0.04 and about 0.35 part water per part cellulose by weight in a sulfation reaction bath maintained at a temperature below about 10° C. to form a slurry containing up to about 8% by weight of cellulose, and agitating the slurry while maintaining the temperature of said slurry within the range from about —5° C. to about 10° C. until a substantially water-soluble cellulose sulfate is formed, said sulfation reaction bath consisting of at least about 3.5 moles of $H_2SO_4$ per mole of cellulose, between about 0.3 and not more than 1 mole of an aliphatic alcohol per mole of $H_2SO_4$, said alcohol containing from 3 to 5 carbon atoms in the molecule and selected from the group consisting of primary and secondary alcohols, and an inert volatile organic diluent, said slurry containing less than 10% water based on the combined weight of $H_2SO_4$ and water.

2. A process for preparing cellulose sulfate which comprises immersing activated cellulose containing between about 0.2 and about 0.3 part water per part cellulose by weight in a sulfation reaction bath maintained at a temperature below about 10° C. to form a slurry containing up to about 8% by weight of cellulose, and agitating the slurry while maintaining the temperature of said slurry within the range from about —5° C. to about 10° C. until a substantially water-soluble cellulose sulfate is formed, said sulfation reaction bath consisting of at least about 3.5 moles of $H_2SO_4$ per mole of cellulose, between about 0.3 and not more than 1 mole of an aliphatic alcohol per mole of $H_2SO_4$, said alcohol containing from 3 to 5 carbon atoms in the molecule and selected from the group consisting of primary and secondary alcohols, and an inert volatile organic diluent, said slurry containing less than 10% water based on the combined weight of $H_2SO_4$ and water.

3. A process for preparing cellulose sulfate which comprises immersing activated cellulose containing between about 0.2 and about 0.3 part water per part cellulose by weight in a sulfation reaction bath maintained at a temperature below about 5° C. to form a slurry containing between about 3% and about 6% by weight of cellulose, and agitating the slurry while maintaining the temperature of said slurry between about 0° C. and about 5° C. until a substantially water-soluble cellulose sulfate is formed, said sulfation reaction bath consisting of between about 7.5 and about 15 moles of $H_2SO_4$ per mole of cellulose, between about 0.3 and not more than 1 mole of an aliphatic alcohol per mole of $H_2SO_4$, said alcohol containing from 3 to 5 carbon atoms in the molecule and selected from the group consisting of primary and secondary alcohols, and an inert volatile organic diluent, said slurry containing less than 10% water based on the combined weight of $H_2SO_4$ and water.

4. A process for preparing cellulose sulfate which comprises immersing activated cellulose containing between about 0.2 and about 0.3 part water per part cellulose by weight in a sulfation reaction bath maintained at a temperature below about 5° C. to form a slurry containing between about 3% and about 6% by weight of cellulose, and agitating the slurry while maintaining the temperature of said slurry between about 0° C. and about 5° C. until a substantially water-soluble cellulose sulfate is formed, said sulfation reaction bath consisting of about 15 moles of $H_2SO_4$ per mole of cellulose, about 0.5 mole isopropanol per mole of $H_2SO_4$, and an inert volatile organic diluent, said slurry containing less than 10% water based on the combined weight of $H_2SO_4$ and water.

References Cited in the file of this patent

UNITED STATES PATENTS 2,539,451    Malm et al.             Jan. 30, 1951